(12) United States Patent
Wallace et al.

(10) Patent No.: US 9,654,608 B2
(45) Date of Patent: May 16, 2017

(54) INFORMATION HANDLING DEVICE WITH BUILT-IN STAND

(71) Applicant: Lenovo (Singapore) Pte. Ltd., Singapore (SG)

(72) Inventors: Brian William Wallace, Wake Forest, NC (US); Ali Kathryn Ent, Garner, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 111 days.

(21) Appl. No.: 14/164,483

(22) Filed: Jan. 27, 2014

(65) Prior Publication Data

US 2015/0215438 A1    Jul. 30, 2015

(51) Int. Cl.
*H04W 88/02* (2009.01)
*H04M 1/02* (2006.01)
*H04M 1/04* (2006.01)

(52) U.S. Cl.
CPC ........ *H04M 1/0297* (2013.01); *H04M 1/0206* (2013.01); *H04M 1/0214* (2013.01); *H04M 1/0235* (2013.01); *H04M 1/04* (2013.01)

(58) Field of Classification Search
CPC .... G06F 1/1626; G06F 1/1632; G06F 1/1628; G06F 1/1616; H04M 1/0206; H04M 1/0214; H04M 1/04; H04M 1/0297; H04M 1/0235; H04M 1/11; H04M 1/02; H04M 1/0227; H04M 1/0252; H04M 1/72519; H04M 1/022; H04M 1/0216; H04W 88/02

See application file for complete search history.

(56) References Cited

U.S. PATENT DOCUMENTS

| | | | |
|---|---|---|---|
| 2007/0236872 A1* | 10/2007 | Kuo ..................... | G06F 1/1613 361/679.27 |
| 2011/0050063 A1* | 3/2011 | Wang et al. ................. | 312/351.1 |
| 2013/0027862 A1* | 1/2013 | Rayner ..................... | 361/679.3 |
| 2013/0152358 A1* | 6/2013 | Formey ..................... | 29/407.09 |
| 2014/0192471 A1* | 7/2014 | Chang et al. ............. | 361/679.26 |
| 2014/0216971 A1* | 8/2014 | Ashley ................... | A45C 11/00 206/472 |
| 2014/0332418 A1* | 11/2014 | Cheung et al. .............. | 206/45.2 |

* cited by examiner

*Primary Examiner* — Meless Zewdu
(74) *Attorney, Agent, or Firm* — Ference & Associates LLC

(57) ABSTRACT

An aspect provides an information handling device, comprising: a display; a processor; memory device storing instructions executable by the processor to operative couple the display to the processor; wherein the display, processor, and memory are located within a housing and the housing comprises a recess in which at least two members are housed. Other aspects are described and claimed.

16 Claims, 5 Drawing Sheets

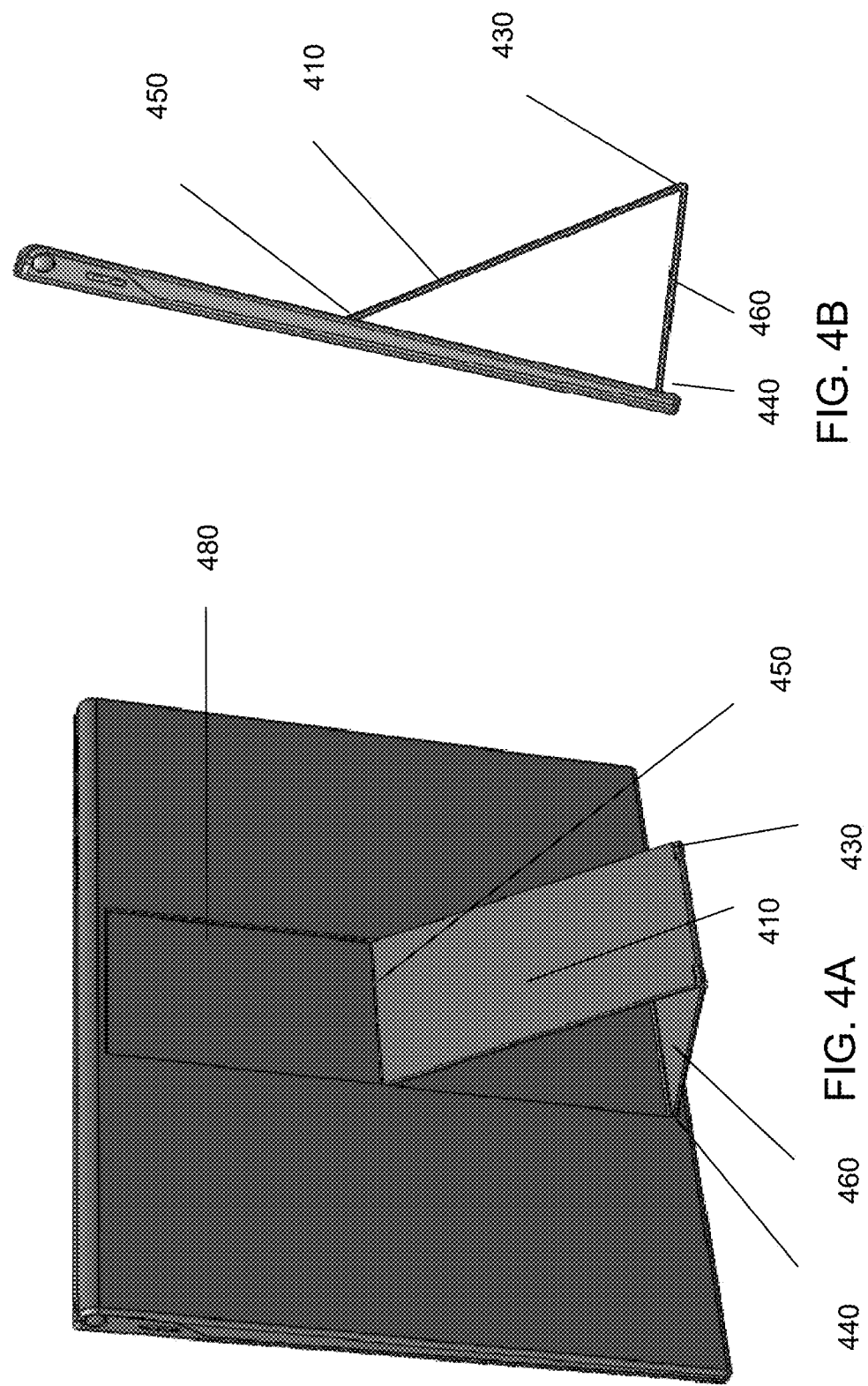

INFORMATION HANDLING DEVICE WITH
BUILT-IN STAND

BACKGROUND

Information handling devices ("devices") come in a variety of forms, for example tablet computing devices, smart phones, and the like. Users of many of these devices prefer to tilt the device for ease of viewing or other reasons.

BRIEF SUMMARY

In summary, one aspect provides an information handling device, comprising: a housing; a display; a processor; and memory storing instructions executable by the processor to affect output to the display; wherein the display, processor, and memory are located within the housing and the housing comprises a recess in which at least two members are housed.

Another aspect provides a method, comprising: pivoting a first member disposed within a recess located within a housing for an information handling device with respect to the housing; pivoting a second member disposed within a recess located within a housing for an information handling device with respect to the first member; securing, to the recess, an end of the second member that is disposed away from the first member.

A further aspect provides a product, comprising: a housing for an information handling device that includes a recess in which an articulating stand member is housed; wherein the stand member pivots at a point in a central portion; wherein one end of the stand member, at a distal end from the point, is pivotally connected to the housing; and wherein another end of the stand member is releasably securable to the housing in at least one position to form an articulated stand.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) provides other views of an information handling device in accordance with an embodiment.

DETAILED DESCRIPTION

Figure 1:
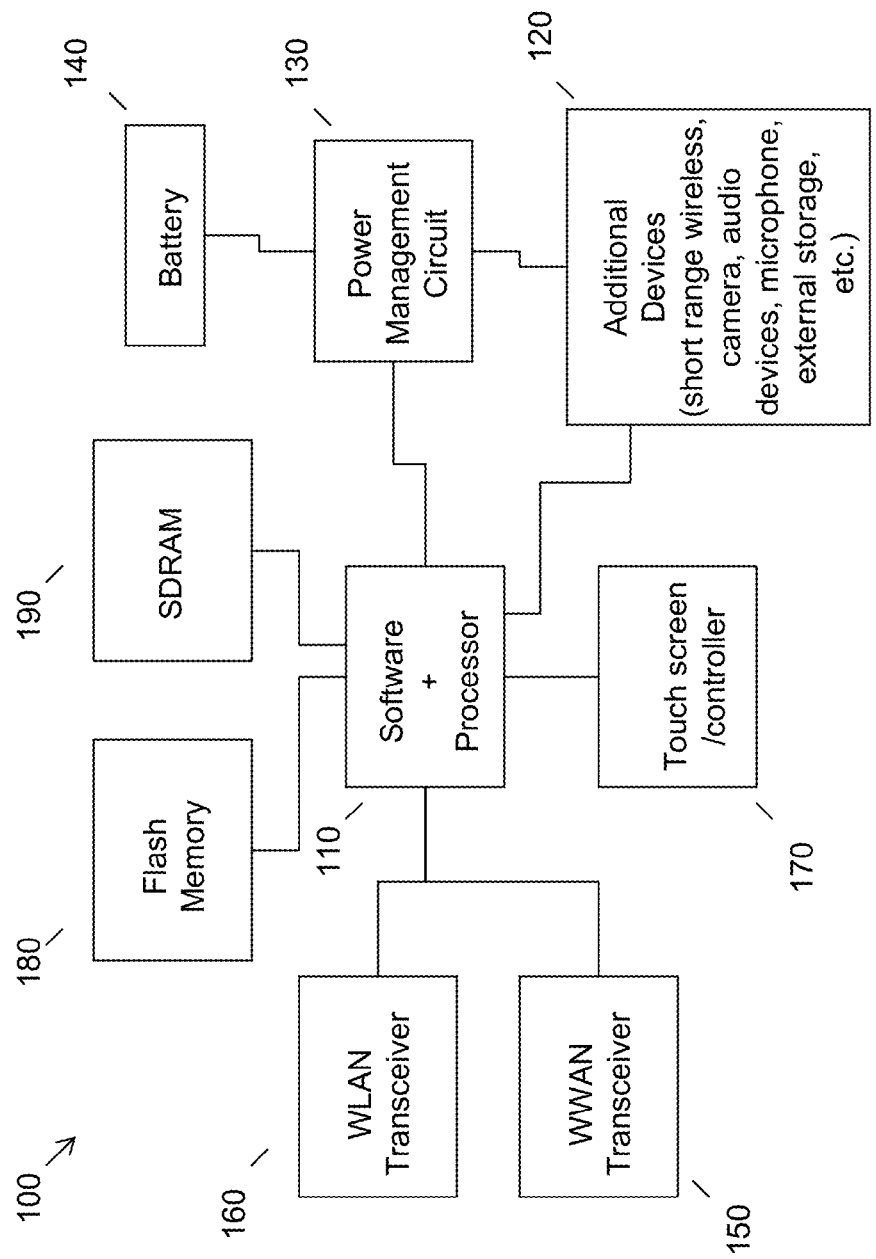
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Devices such as tablet computing devices, smart phones, and the like are increasingly common and when a flat surface is available, users may prefer to place such a device on the flat surface to aid in ease of display. To assist in doing so, some such devices have been equipped with built-in stands or travel displays have been utilized. Such solutions, however, have a limited number of viewing angles and/or increase the thickness of the device (e.g., increasing the thickness by 6-10 mm to allow for friction hinges).

Devices can take any number of a wide variety of shapes and form, but in an embodiment comprises a processor and a touch-sensitive or pressure-sensitive screen which a user may manually manipulate to provide inputs to, and from which the user may receive outputs. The device may be generally flat and planar, and rectangular in top view, and in an embodiment does not have a keyboard.

Accordingly, embodiments provide apparatus and systems that allow a user utilize a device with a built-in stand such that the user may select among a multiple number of viewing angles. This allows users to select the viewing angle that is most appropriate for a given situation. A user may wish to vary the viewing angle of the device for any number of reasons, including background (ambient) lighting, ease of interaction with the device (e.g., playing a game), and sharing the information being displayed with another person. As such, any number of viewing angles may be desirable by a user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
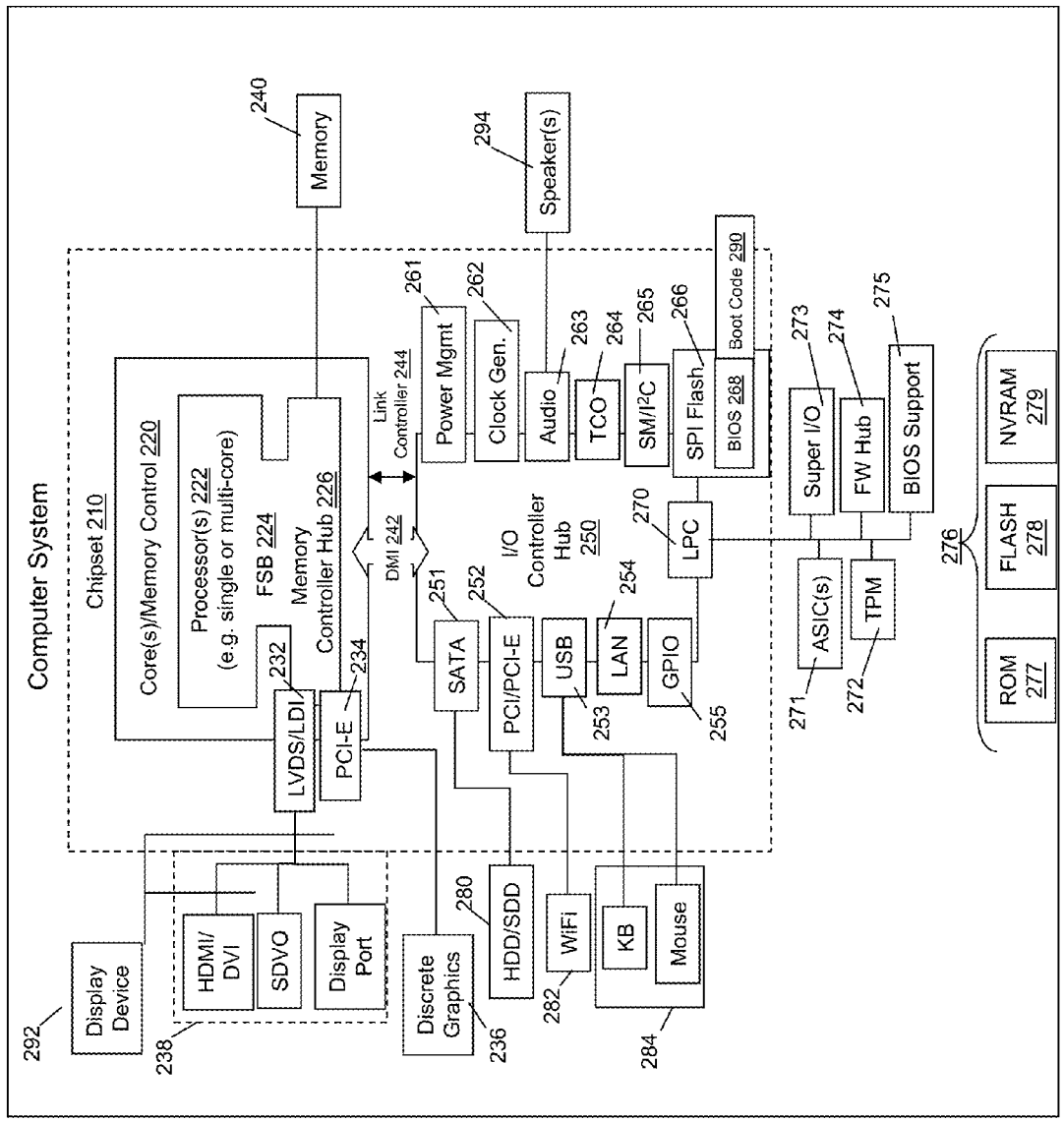
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices such as tablet computing devices, smart phones, and the like such as those shown in FIGS. 3-5. The description now turns to FIGS. 3-5. Where similar components are shown in multiple figures, the reference numeral for the component is increased in the hundredths figures (e.g., 310 is the component in FIGS. 3 and 410 is the component in FIG. 4).

Figure 3B:
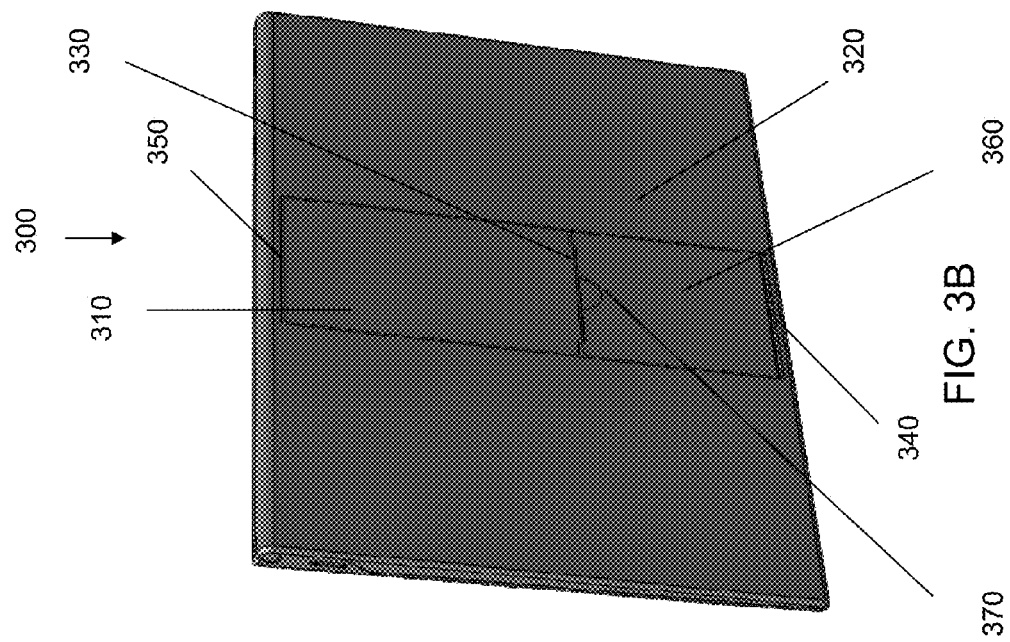
FIG. 3(A-B) illustrates an examples of the front and back of an information handling device in accordance with an embodiment.
Figure 3A:
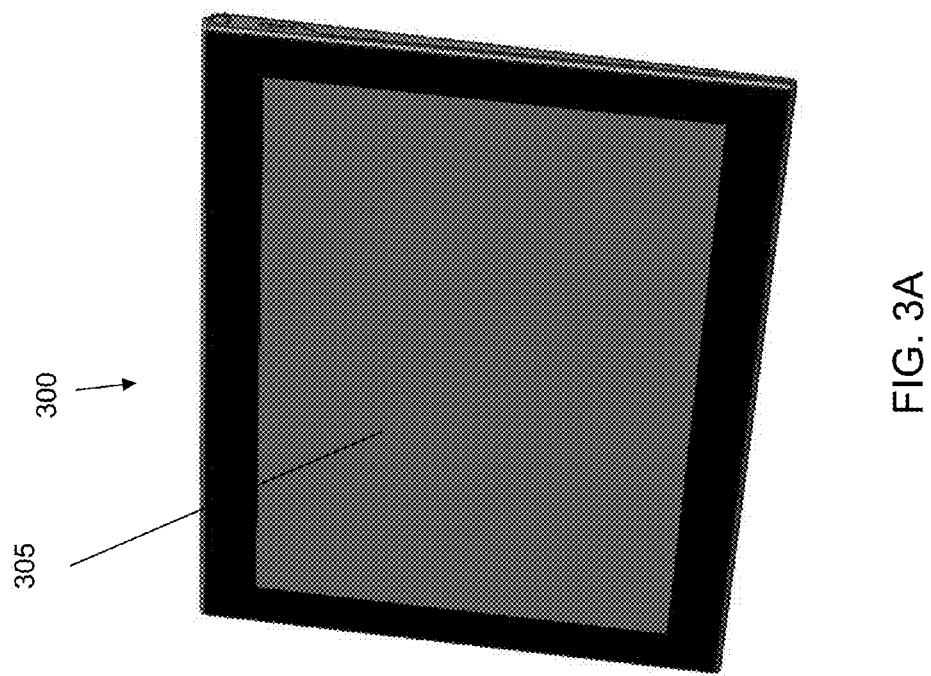

FIG. 3A is a front view of information handling device 300, showing the display (or input) surface 305. FIG. 3B is a back view of information handling device 300 in accordance with an embodiment of a built-in stand. In very general terms, two thin members or arms (310, 360) are shown together with a non-slip material or molded in stop points on the back surface (320). The members are attached with an axel in the middle (330) and the bottom arm (360) attaches with a second axel (340). The members may be formed as a unit, e.g., a single member with a score or thinning area or areas to allow articulation. The top (350) of the top (or first) arm (310) slides down along a non-slip surface or molded in stop points to a user's desired angle of view tilt. The stand is easy to open, using finger detent 370, and is also easy to close. This embodiment allows for varying tilt angles from about 20 degrees to 80 degrees. In FIG. 3, the display stand is shown in the closed position.

The touchstone is there is a high coefficient of friction along the top of the top arm. This friction may be induced in any suitable way. As referenced above, there may be a non-slip surface within the recess which hold the arm and upon which the arm interacts. There may also be molded in stop-point along the sides of the recess in which holds the members and upon which the top edge of the arm interacts (e.g., an axel with compressible ends that compress as the axel (and top of the arm) moves within the recess). Alternatively, the recess in which the members are contained may contain molded in stop points, together with a channel in which an axel may have uninhibited lateral motion, and when the desired viewing angle is reach, the axel is placed into a stop point.

The proportional size of the two members with respect to one another is a policy determination (e.g., design choice) driven by the range of viewing angles desired. The members may be of either equal or unequal length. Preferably, bottom arm 360 is of such a length that when opened, the center of gravity of the device is such the stand is a stable viewing platform for the device (e.g., the device is so unstable that it easily falls over). It is presently preferred that the ratio of top arm to bottom arm is proportional to the size of the device to allow for stable tilt function in a maximum number of solutions.

FIG. 4(A-B) illustrates a device having an opened stand, where the device is positioned in a vertical orientation. FIG. 4A is a back view of the device, while FIG. B is a side view of the device. As illustrated, molded recess (480), in which the members (410, 460) were housed is now visible. The members (410, 460) are connected by axel 430), and the bottom arm (460) is connected to the rear cover the device by axel (440). Top (450) are arm 410 is also shown. While the term axel is used herein, this is a pivot point any suitable means of creating a pivot may be used. Given the recess 480, any number of adjustable tilt angles may be achieved depending upon where a user places the top (450) of arm 410.

Figure 5A:
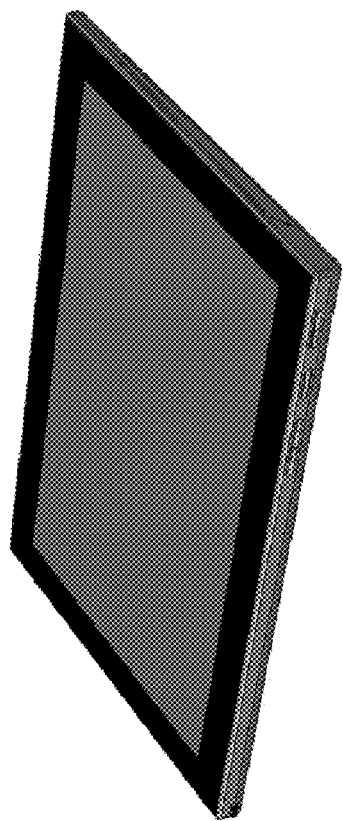
FIG. 5(A-C) provides additional views of an information handling device in accordance with an embodiment.
Figure 5B:
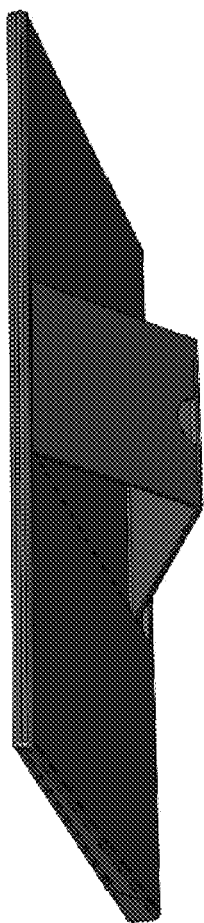
Figure 5C:
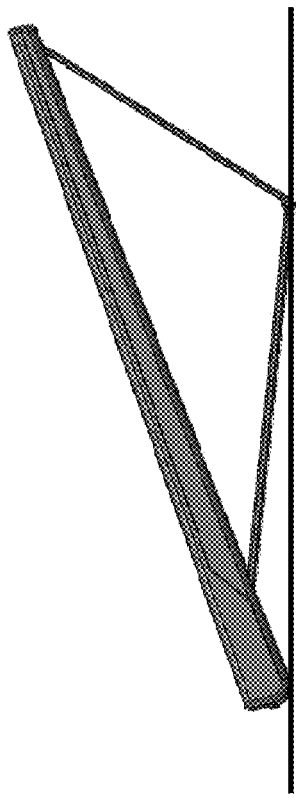

FIG. 5(A-C) illustrates a device with an open stand, where the device is positioned in a horizontal orientation. FIG. 5(A) shows a front perspective view of the device; FIG. 5(B) shows a rear perspective view; and FIG. 5(C) shows a side perspective view. When the stand is open and the device is in this horizontal orientation, a smaller degree of tilt angle may be obtained (e.g., 20 degrees or thereabouts) when compared with the stand being open and the device in the vertical orientation (e.g., 80 degrees or thereabouts).

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device, comprising:
   a housing;
   at least two supporting members;
   a display;
   a processor; and
   memory for storing data to affect output by the processor to the display;
   wherein the display, processor, and memory are located within the housing;
   the housing comprising a recess in which the at least two supporting members are housed, the recess having a top edge, a bottom edge, and two parallel side edges; and
   the two parallel side edges of the recess comprising a high coefficient of friction produced by a mechanism selected from the group consisting of a plurality of stop points positioned in the parallel side edges and a material formed in the parallel side edges having the high coefficient of friction.

2. The information handling device of claim 1, wherein the members are pivotally connected to each other.

3. The information handling device of claim 2, wherein one member, at a distal end from the pivot, is pivotally connected to the housing.

4. The information handling device of claim 2, wherein one of the two members comprises a finger detent.

5. The information handling device of claim 1, wherein the stop points comprise indents on which a member rests.

6. The information handling device of claim 1, wherein the material having the high coefficient of friction is a non-slip surface.

7. A method, comprising:
   pivoting a first supporting member disposed within a recess located within a housing for an information handling device with respect to the housing, the recess having a top edge, a bottom edge, and two parallel side edges;
   pivoting a second supporting member disposed within the recess located within a housing for an information handling device with respect to the first member; and
   securing, to the recess, an end of the second member that is disposed away from the first member;
   wherein the securing comprises securing a top of the second member in the parallel side edges of the recess comprising a high coefficient of friction produced by a mechanism selected from the group consisting of a plurality of stop points positioned in the parallel side edges and a material formed in the parallel side edges having the high coefficient of friction.

8. The method of claim 7, wherein the first and second members are pivotally connected to each other.

9. The method of claim 8, wherein one of the first and second supporting members, at a distal end from the pivot, is pivotally connect to the housing.

10. The method of claim 8, wherein one of the two members comprises a finger detent.

11. The method of claim 7, wherein the stop points comprise indents on which a top portion of the top supporting member rests.

12. A product, comprising:
    a housing for an information handling device that includes a recess in which an articulating stand member is housed, the recess having a top edge, a bottom edge, and two parallel side edges;
    the two parallel side edges of the recess comprising a high coefficient of friction produced by a mechanism selected from the group consisting of a plurality of stop points positioned in the parallel side edges and a material formed in the parallel side edges having the high coefficient of friction;
    wherein the stand member pivots at a point in a central portion;
    wherein one end of the stand member, at a distal end from the point, is pivotally connected to the housing; and
    wherein another end of the stand member is releasably securable to the housing in at least one position to form the articulated stand.

13. The product of claim 12, wherein the stand member comprises at least two members.

14. The product of claim 12, wherein the housing comprises a removable cover for an information handing device.

15. The product of claim 12, wherein the plurality of stop points comprise indents on which the another end of the stand member rests.

16. The product of claim 12, wherein the material having the high coefficient of friction is a non-slip surface.

* * * * *